United States Patent
Richter et al.

(10) Patent No.: US 9,459,673 B2
(45) Date of Patent: *Oct. 4, 2016

(54) SYSTEM AND A METHOD FOR REMOTELY INTERACTING WITH ITEMS PRESENT IN AN ENVIRONMENT FOR COMMUNICATING WITH COMPUTING DEVICE

(71) Applicant: R2Z Innovations, Inc., Vancouver (CA)

(72) Inventors: Wolfgang Richter, NW (DE); Faranak Zadeh, Vancouver (CA)

(*) Notice: Subject to any disclaimer, the term of this patent is extended or adjusted under 35 U.S.C. 154(b) by 0 days.

This patent is subject to a terminal disclaimer.

(21) Appl. No.: 14/496,261

(22) Filed: Sep. 25, 2014

(65) Prior Publication Data

US 2016/0231792 A1    Aug. 11, 2016

Related U.S. Application Data

(63) Continuation of application No. 14/140,495, filed on Dec. 25, 2013, now Pat. No. 9,307,346.

(51) Int. Cl.
| | |
|---|---|
| *G06F 15/16* | (2006.01) |
| *G06F 1/26* | (2006.01) |
| *H04L 29/08* | (2006.01) |
| *H04W 4/00* | (2009.01) |
| *G05B 19/10* | (2006.01) |

(52) U.S. Cl.
CPC ............. *G06F 1/26* (2013.01); *G05B 19/102* (2013.01); *H04L 67/025* (2013.01); *H04W 4/001* (2013.01); *G05B 2219/2639* (2013.01)

(58) Field of Classification Search
CPC .... H04W 4/006; H04W 4/005; H04L 29/08; H04L 29/06
USPC .......................................................... 709/217
See application file for complete search history.

(56) References Cited

U.S. PATENT DOCUMENTS

| | | | |
|---|---|---|---|
| 2005/0120096 A1* | 6/2005 | Rekimoto .............. | G08C 17/02 709/220 |
| 2009/0105567 A1* | 4/2009 | Smith ................. | G06F 19/3418 600/323 |
| 2012/0037615 A1* | 2/2012 | Hafner .................. | A47J 27/002 219/647 |
| 2012/0315863 A1* | 12/2012 | Hasegawa ............ | H04B 1/1607 455/73 |

* cited by examiner

*Primary Examiner* — Arvin Eskandarnia (57) ABSTRACT

Disclosed is a system and a method for remotely interacting with an item in an electric field affected environment for communicating with a computing device. The system includes a host connected to an alternating current source of the environment, and one or more client units for interacting with each item of the environment. The host receives the command from the computing device, and further the host sends the command data via modulated electric field to the client unit. The client unit includes a sensing element to the sense the condition of the item, based on the command data received from the host, and the client unit further sends the feedback data to the computing device via the host controller. The client unit further includes acting elements for notifying the condition of the item.

15 Claims, 5 Drawing Sheets

SYSTEM AND A METHOD FOR REMOTELY INTERACTING WITH ITEMS PRESENT IN AN ENVIRONMENT FOR COMMUNICATING WITH COMPUTING DEVICE

CROSS-REFERENCE TO RELATED APPLICATIONS

This application is a continuation-in-part application of U.S. application Ser. No. 14/140,495 filed on Dec. 25, 2013, the entire contents of which are incorporated herein by references in its entirety.

BACKGROUND OF THE INVENTION

1. Field of the Invention

The present invention generally relates to a system and a method for item monitoring, and more particularly relates to a system and a method for remotely interacting with one or more items present in an environment for communicating with a computing device.

2. Description of Related Art

Internet now is being used with other technologies to meet the requirements of humans. One such field is known as Internet of Things (IOT). The Internet of things, also known as the Internet of items, refers to the networked interconnection of everyday items. It is described as a self-configuring wireless network of sensors whose purpose would be to interconnect all things.

Presently the electricity consumption of a home or a facility is measured, recorded and calculated on receiving alternating current (AC) by an electricity meter. There is a need for additional efforts in order to measure the power consumption of connected appliances. Conventionally outlet metering is being used, where meter plugs are connected in between the outlet and the appliances. Some of such meters can send their measurement data to a host or a hub which can be controlled by a user. But in outlet metering, the user has to identify the connected appliances by manually finding out their specific power consumption.

Conventionally, a clamp AM-meter is known, which is a handled meter with a ring shaped clamp used to measure the current of a cable or an electric wire. This works only with AC and for direct current (DC) measurement there is a need of magnetic sensors like haul element, Hall effect sensor, magnetometer, magneto-optical sensor, and MEMS sensor to measure the strength of the magnetic field. Further there is an inevitable requirement to employ an additional battery source to power the magnetic sensors.

Therefore there is a need of a system and a method for remotely interacting with items affected in an environment for communicating with the computing devices without the use of batteries. Further the system and the method should determine the condition of the item without the use of the magnetic sensors. Furthermore the system and the method should provide a simple way to identify and monitor AC and DC parameters pertaining to the electric wires of the connected appliances.

SUMMARY OF THE INVENTION

An object of the present invention is to provide a system and a method for remotely interacting with items in an electric field affected environment for communicating with a computing device.

The system includes a host connected to an alternating current source of the environment, and client units for interacting with each item of the environment. The host includes a convertor for generating DC power from the AC power received from the alternating current source, a generator for generating electric field from contactlessly received DC power from the convertor, a demodulator for receiving command data from the computing device, a host controller modulates the electric field and further the host controller processes the command data received from the demodulator and further the host controller generates a signal and further generates an identification number for marking each item, and a wireless interface for sending the processed data to the computing device.

The client unit includes an electric field harvester for enhancing electric field provided by the host and further stores DC power from the electric field, a client controller for processing the signal received via the modulated electric field from the host controller and further reads the identification number for each item received from the host controller.

The client unit includes a sensing element for sensing a condition of the item based on the processed signal from the client controller. The sensing element includes a flexible conductive foil wrapped around the item for conducting the induced electric field, a ring electrode for receiving capacitively coupled power from the electric field induced by the item, and a floating electrode for floating the electric field received from the ring electrode to the ground.

In another object of the present invention, the ring electrode further detects the magnetic field caused by the current flowing through the item. The floating electrode further includes a readable code unit on the visible side of the flexible foil in such a way that the readable code unit is recorded by the computing device. The electric field harvester includes a rectifier to generate DC voltage corresponding to the electric field received from the surface of the sensing element.

The client controller includes an instrumentation amplifier for measuring the value of current flowing through the item powered by the remote host. The instrumentation amplifier further measures the magnetic field caused by the current flowing through the item. The instrumentation amplifier then measures the condition of the item based on the measured current value of the item. An integrated analog digital modulating unit modulates the alternating electric field with an identification number and the measured condition of the item. The client unit sends the feedback data to the computing device through the host.

Another object of the present invention is to provide an acting element for notifying the condition of the item based on the processed signal from the client controller.

Another object of the present invention is to provide a system for remotely interacting with an electric wire of the connected appliances for communicating with a computing device. The system includes the client unit interacting with the electric wire of the connected appliances, on receiving signals from the host. A host works like an internet hub.

Another object of the present invention is to provide a system wherein a user may record the readable code unit with the help of computing device outside of the client unit which is not accessible to the host, and then may name the client unit with an alias (identification number). The computing device may be a smart phone for optical symbol or character recognition. The host is connected later to the computing device under the user's control and reports the current control for the electric wire to the client unit.

Further features and advantages of the present invention, as well as the structure and operation of various embodiments of the present invention, are described in detail below with reference to the accompanying drawings.

DETAILED DESCRIPTION OF DRAWINGS

While this technology is illustrated and described in a preferred embodiment, a method and a system for remotely interacting with items in an electric field affected environment for communicating with a computing device may be produced in many different configurations, forms and materials. There is depicted in the drawings, and will herein be described in detail, as a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the technology described herein.

Figure 1:
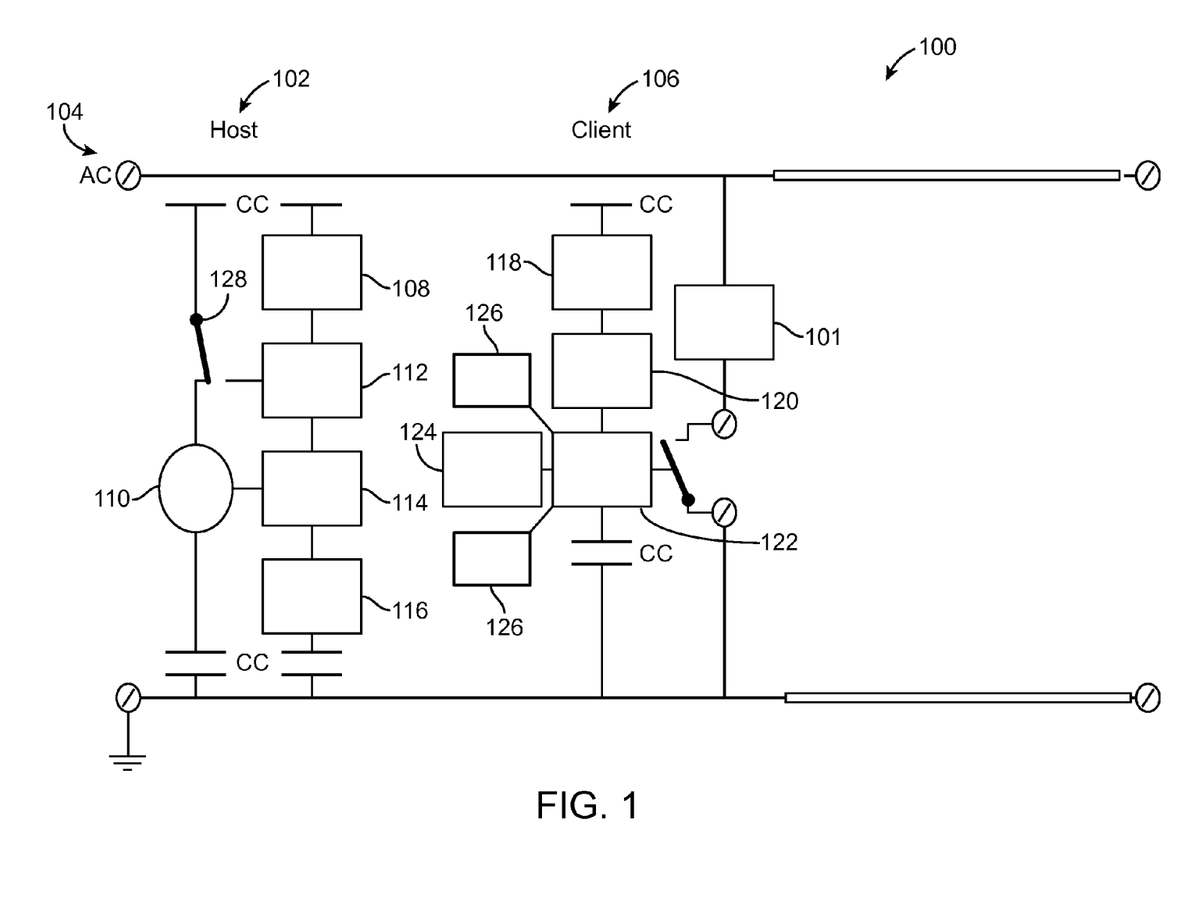
FIG. 1 illustrates a block diagram of a system for remotely interacting with items in an environment for communicating with a computing device, in accordance with a preferred embodiment of the present invention.

FIG. 1 illustrates a block diagram of a system 100 for remotely interacting with one or more items in an electric field affected environment 101. The system 100 includes a host 102 connected to an alternating current source 104 of the environment 101, and a client unit 106 interacting with the items affected by the electric field of the environment 101. The host 102 includes a converter 108, a generator 110, a demodulator 112, a host controller 114 and a wireless interface 116. The client unit 106 includes an electric field harvester 118, a client controller 120, an interface 122, a sensing element 124 and plurality of acting elements 126.

In a preferred embodiment of the present invention, the converter 108 generates DC power from the AC power of the alternating current source. Examples of converter 108 includes but not limited to rectifiers, inductor, resonator, cascade, diode bridges, transformer, and level shifter. However, it will be readily apparent to those with ordinary skill in the art that the various other types of converter 108 may also be used for generating DC power from the AC power without deviating from the scope of the present invention.

The generator 110 creates an electric field from the capacitively coupled DC power output of the converter 108. Examples of generator 110 includes but not limited to oscillators, PWM, VCO, DAC, gates, and multivibrators. However, it will be readily apparent to those with ordinary skill in the art that the various other types of generator 110 may also be used for generating electric field without deviating from the scope of the present invention.

From the computing device (not shown in FIG. 1), the demodulator 112 receives a command data pertaining to the item (not shown in FIG. 1), and then transmits the received data to the host controller 114. The demodulator 112 may include a radio frequency tuner that receives a transmission via the Internet, from a cable TV coaxial cable, satellite radio, or a broadcast radio frequency aerial transmission. The radio frequency tuner may receive the command data via electromagnetic radio wave transmission over the carryover wire or through the air.

For Internet reception, the demodulator/tuner 112 may further include an IP network interface that receives a transmission from an Internet twisted pair, a wireless interface or other IP medium that receives a transmission from an Internet source and/or, an optical receiver that receives a transmission from an Internet fiber or through the air. However, it will be readily apparent to those skilled in the art that the various other types of demodulator 112 may also be used for receiving and transmitting data.

The host controller 114 processes the command data received from the demodulator 112. The host controller 114 modulates the electric field on the basis of the processed command data. In a preferred embodiment of the present invention, the host controller 114 contactlessly receives the processed data from the demodulator 112. Further, the host controller 114 generates a signal for the client controller 120. Examples of signal are explained in detail in conjunction with FIG. 3 of the present invention.

Further, the host controller 114 generates an identification number for marking each item in the environment 101. The identification number identifies the item in the environment 101. Examples of the identification number include but not limited to numeric key, alphanumeric key, color key or condition key.

The wireless interface 116 sends the processed data received from the host controller 114 to the computing device (not shown in FIG. 1). Examples of wireless interface 116 include but not limited to bluetooth, internet, and intranet. However, it will be readily apparent to those skilled in the art that the various other types of wireless interface 116 may also be used for communicating with the computing device (not shown in FIG. 1).

The electric field harvester 118 enhances the electric field energy provided by the host 102 communicating with the environment 101. The electric field harvester 118 works on the principle of an AC circuit using preferably DC rectifying unit to enhance the electric field provided from the host 102. It will be readily apparent to those skilled in the art that various device may be used for rectification without deviating from the scope of the invention.

The client controller 120 processes the signal received via modulated electric field from the host controller 114. The principle of receiving signals from electric field is known in the art. Examples of the client controller 120 include but not limited to MCU, SOCs, FPGAs, state machines or other logic circuits. The signals contain commands to be performed by the client controller 120. Example of the commands is explained in detail in conjunction with FIG. 3 of the present invention.

Further, the client controller 120 receives the identification number of each item (not shown in FIG. 1) in the environment 101 received from the host controller 114 via the modulated electric field. The identification number helps the client controller 120 to identify the item (not shown in FIG. 1) for which the signal is send by the host controller 114.

The sensing element 124 receives the processed signal from the client controller 120. The sensing element 124 comprises plurality of electrodes for sensing the condition of item based on the processed signal from the client controller 120. The client controller 120 generates a feedback data associated with the sensed condition of the item (not shown in FIG. 1) such that the client controller 120 sends the feedback data to the computing device (not shown in FIG. 1) through the host controller 114.

The client controller 120 generates a feedback data for the host controller 114. The feedback data contains the data generated after performing commands provided in the signals from the host controller 114. The feedback data is the data related to the identification number and sensed information about the item (not shown in FIG. 1) in the environment 101. The host controller 114 then transmits the data to the computing device (not shown in FIG. 1) through the wireless interface 116. Examples of computing device (not shown in FIG. 1) includes but not limited to IPAD, smartphones, laptop, notebook, and smart TV.

In preferred embodiment of the present invention, the host 102 and the client unit 106 both include buffers for storing the excess DC power. The electric field harvester 118 enhances the electric field energy and further the enhanced energy are used to continuously fill buffers.

The client unit 106 further includes an acting element 126 for providing notification about the condition of the item (not shown in FIG. 1) based on the signal received from the client controller 120. The notification signal includes but not limited to a light signal, an audio signal, and in combination thereof. Examples of acting element 126 includes but not limited to LED, Speakers, and in combination thereof.

In the preferred embodiment of the present invention, the host 102 communicates with the item (not shown in FIG. 1) such as electric wire connected to the environment 101 like electric/electronic appliances. An example of system 100 for interacting with the electric wire connected to the appliance is explained in detail in conjunction with FIG. 2 of the present invention.

In the preferred embodiment of the present invention, the feedback data provides the details about the condition of the item (not shown in FIG. 1), where the condition of the item (not shown in FIG. 1) is about a current value of the electric wire connected to the electric/electronic appliances.

In another embodiment, the interface 122 handles the switch operations from the client controller 120. The switch operations relates to alteration of the electric loads or charges, turning on or off the item (not shown in FIG. 1). Examples of interface 122 include but not limited to I/O-ports, gates, flip-flops, opto-couplers, relays, triacs, IGBTs, and MOSFETs.

Figure 2:
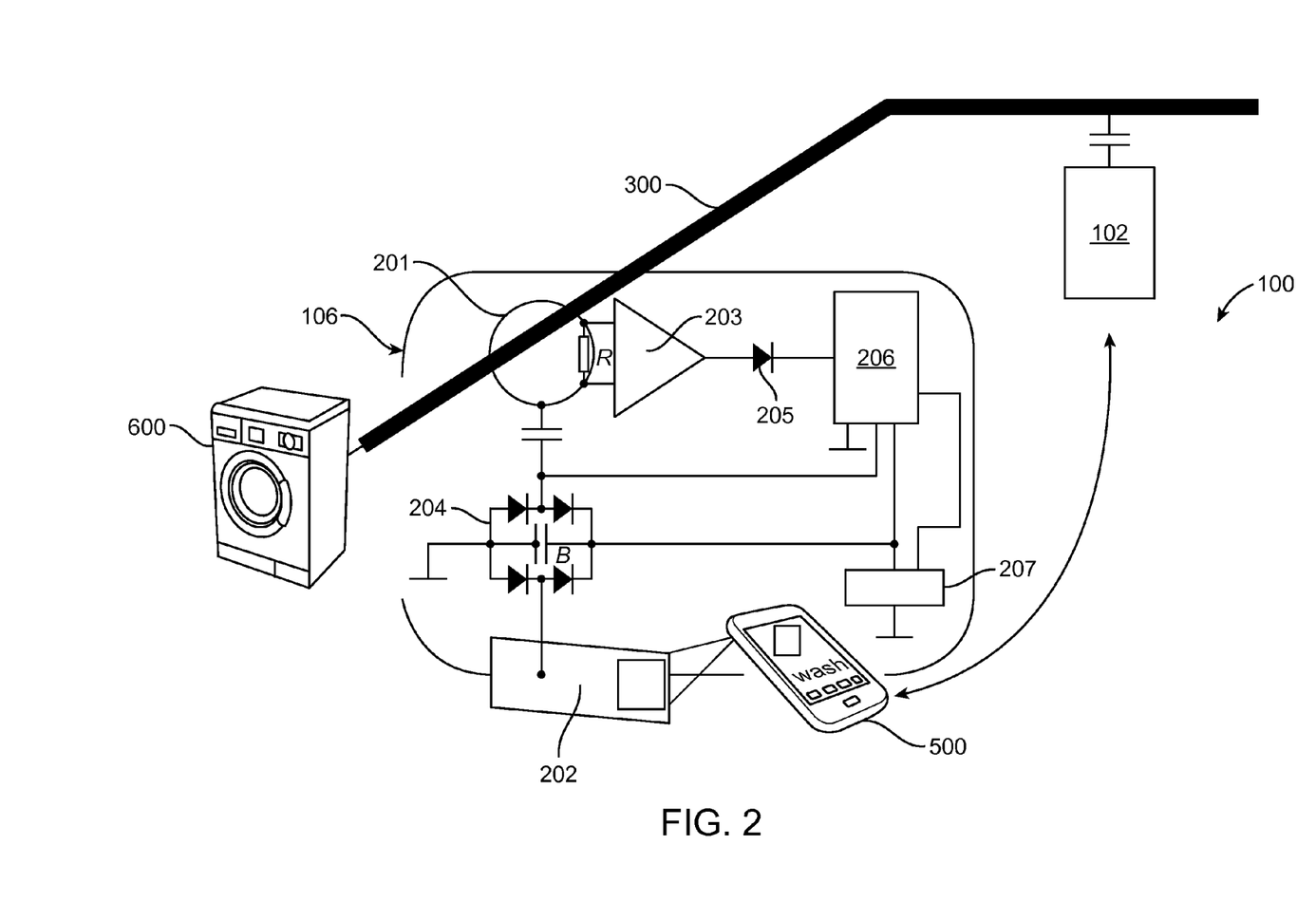
FIG. 2 illustrates another block diagram of the system for remotely interacting with electric wire connected to an appliance for communicating with a computing device, in accordance with the another preferred embodiment of the present invention.

FIG. 2 illustrates a block diagram of the system 100 for remotely interacting with an electric wire 300 connected to an appliance 600 communicating with a computing device 500. The system 100 includes a host 102 connected to an alternating current source of the appliance 600, and a client unit 106 interacting with the electric wire 300 affected by the electric field of the appliance 600. The client unit 106 includes a sensing element (not shown in FIG. 2), an electric field harvester (not shown in FIG. 2) and a client controller (not shown in FIG. 2).

The sensing element (not shown in FIG. 2) senses a condition of the electric wire 300 based on a processed signal from the client controller. The sensing element includes a flexible conductive foil wrapped around the electric wire 300 for conducting the induced electric field. The sensing element further includes a ring electrode 201 and a floating electrode 202 formed by wrapping the foil around the electric wire 300 of the appliance 600.

The ring electrode 201 receives the capacitively coupled power from the electric field caused by the current flowing through the electric wire 300 powered by the remote host 102. The ring electrode 201 further detects the magnetic field caused by the current flowing through the electric wire 300. The floating electrode 202 ensures grounding of the client unit 106 by floating the electric field received from the ring electrode 201 to the ground.

The electric field harvester (not shown in FIG. 2) includes a rectifier 204 to generate a DC voltage corresponding to the electric field received from the surface of the sensing element (not shown in FIG. 2). At least a buffer B is configured to store the DC voltage generated by the rectifier 204.

The client controller (not shown in FIG. 2) includes the instrumentation amplifier 203 for measuring the value of current flowing through the electric wire 300. The instrumentation amplifier 203 further measures the magnetic field caused by the current flowing through the electric wire 300. The instrumentation amplifier 203 further measures the condition of the electric wire 300 based on the measured current value of the electric wire 300. A rectifier 205 rectifies the output of the instrumentation amplifier 203. An integrated analog digital modulating unit 206 receives the rectified output from the rectifier 205, and the analog digital modulating unit 206 further generates a feedback data by modulating the electric field with an identification number and the measured condition of the electric wire 300.

The client unit 106 is allocated with a time slot to communicate with the host 102 via a wireless interface (shown and explained in FIG. 1). The time slot enables the host 102 to recognize and identify the client unit 106 establishing communication via the wireless interface (shown and explained in FIG. 1). The time slot is programmed in the host controller corresponding to the client controller at the time when the client unit 106 is wrapped around the wire 300.

The host controller (not shown in FIG. 2) sends the identification number and the measured condition of the electric wire 300 to the computing device 500 through an interface (not shown in FIG. 2). Hence the electric wires 300 connected to the appliance 600 are monitored by the system 100.

Further one or more acting elements 207 receives the processed signal from the client controller (not shown in FIG. 2) for notifying the condition of the electric wire 300. In the preferred embodiment, the acting element 207 is a LED that emits the light signal to identify the location of the electric wire 300 of the appliance 600.

In another preferred embodiment the acting elements 207 receive the processed signal from the client controller (not shown in FIG. 2) for controlling the condition of the electric wire 300, when an abnormal condition of the current value is detected.

Figure 3:
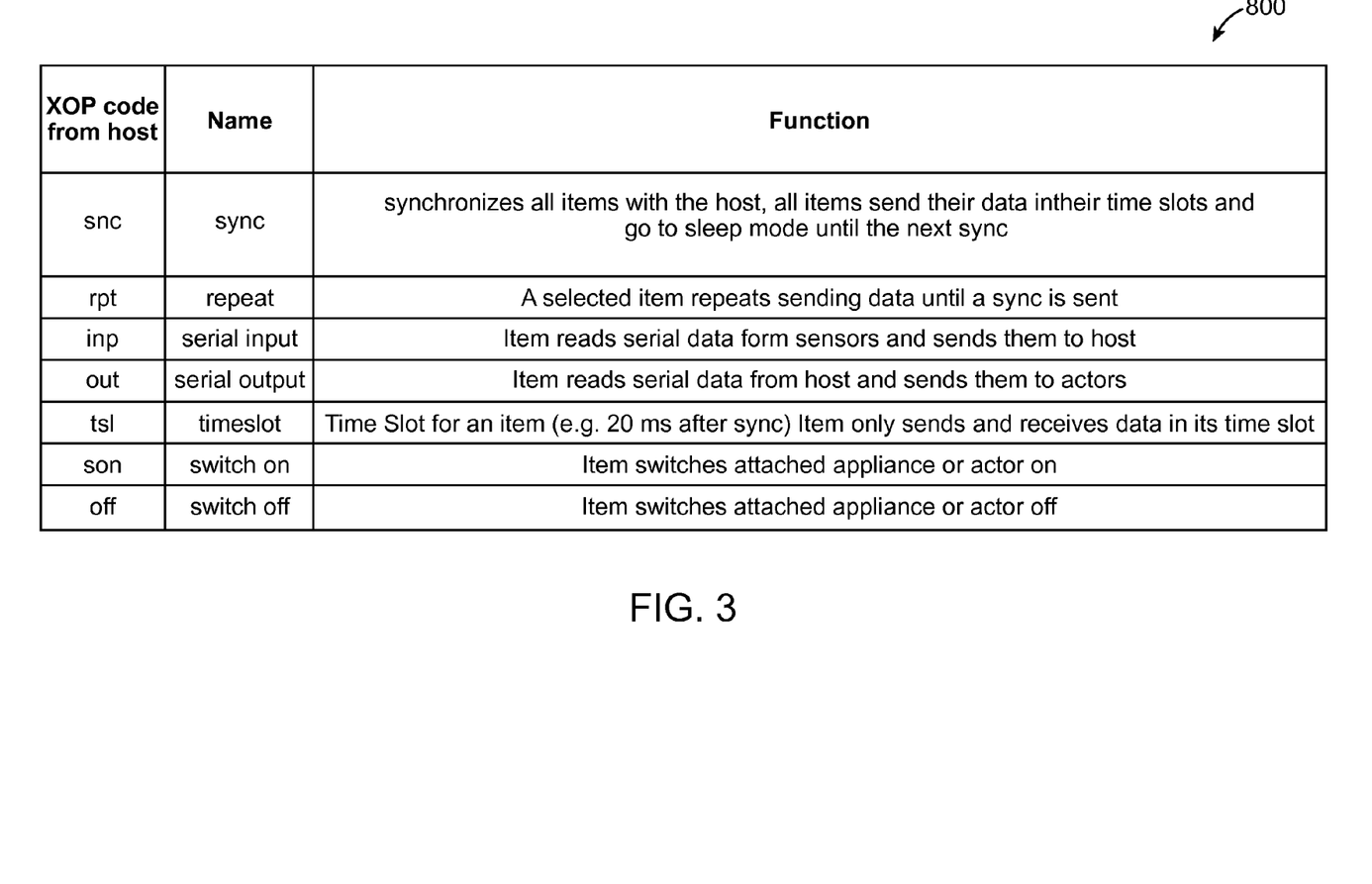
FIG. 3 illustrates a table for defining exemplary signals generated from the host for the client unit.

FIG. 3 illustrates a table 800 for defining exemplary signals generated from the host for the client unit. In an exemplary embodiment of the present invention, the host controller generates signals for the client unit. Exemplary signals of the host controller include but not limited to following:

a) snc (Sync) for synchronizes all item with the host, all item send their data in their time slots and go to sleep mode until the next sync b) rpt (repeat) for sending data repeatedly from a selected item until a sync is sent
c) inp (serial input) client controller reads serial data and sends them to host controller
d) out (serial output) client controller reads serial data from host controller and sends them to acting elements
e) tsl (timeslot) for sending and receiving data in a time slot by a client (e.g 20 ms after sync)
f) son (switch on) for switching attached appliance or acting element of the client unit
g) off (switch off) for switching attached appliance or actor off by the client unit.

It will be noted that those skilled in the art may envisioned various signal to communicate from host to client unit without deviating from the scope of the present invention.

The present invention offers various advantages. The present invention allows a user to identify any item present in an environment affected by the electric field. The present invention allows the user to identify from a remote location about the current consumption of the appliance such as washing machine, identify and locate any cable or the electric wire of the washing machine. The present invention communicates with the computing device and thus enables the user to communicate with the item in an environment from a remote location resulting in saving their time and brings a whole new world of internet of things.

Figure 4:
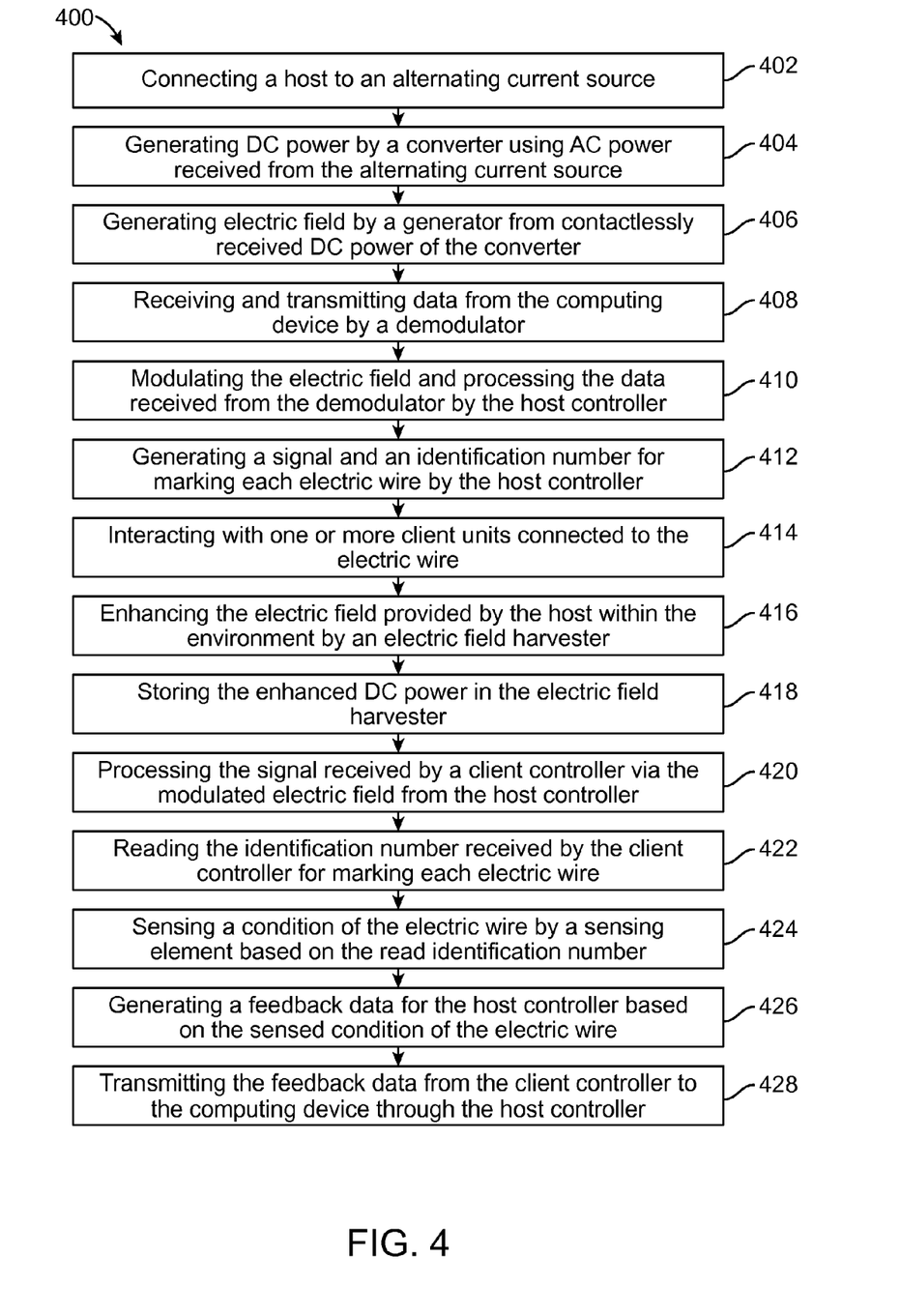
FIG. 4 illustrates a flowchart of a method for remotely interacting with electric wire connected to an appliance for communicating with a computing device, in accordance with the another preferred embodiment of the present invention.

FIG. 4 illustrates a flowchart of a method 400 for remotely interacting with an electric wire connected to an appliance for communicating with a computing device. The method 400 initiates with a step 402 of connecting a host to an alternating current source. The connection of the host to the alternating current source is explained in detail in conjunction with FIG. 1 of the present invention.

The step 402 is then followed by a step 404 of generating DC power by a converter using AC power received from the alternating current source. The generation of DC power is explained in detail in conjunction with FIG. 1 of the present invention.

The step 404 is then followed by a step 406 of generating electric field by a generator from contactlessly received DC power of the converter. The generation of electric field is explained in detail in conjunction with FIG. 1 of the present invention.

The step 406 is then followed by a step 408 of receiving and transmitting data from the computing device by a demodulator. The functionality of the receiving and transmitting data from the computing device is explained in detail in conjunction with FIG. 1, and FIG. 2 of the present invention.

The step 408 is then followed by a step 410 of modulating the electric field and processing the data received from the demodulator by a host controller. The step 410 is then followed by a step 412 of generating a signal and an identification number for marking each electric wire by the host controller. The functionality of the host controller is explained in detailed in conjunction with FIG. 1 of the present invention.

The step 412 is then followed by a step 414 of interacting with one or more client units connected to the electric wire. The interaction of one or more clients with the items is explained and detail in conjunction with FIG. 1, and FIG. 2 of the present invention.

The step 414 is then followed by a step 416 of enhancing the electric field provided by the host within the environment by an electric field harvester. The step 416 is then followed by a step 418 of storing the enhanced DC power in the electric field harvester. The functionality of the electric field harvester is explained in detail in conjunction with FIG. 1 of the present invention.

The step 418 is then followed by a step 420 of processing the signal received by a client controller via the modulated electric field from the host controller. The process of receiving signal from the modulated electric field is explained in detail in conjunction with FIG. 1 of the present invention.

The step 420 is then followed by a step 422 of reading the identification number received by the client controller for marking each electric wire. The identification number allows the client controller to identify each electric wire affected by the electric field. The process of reading the identification number by the client controller is explained in detail in conjunction with FIG. 1, and FIG. 2 of the present invention.

The step 422 is then followed by a step 424 of sensing a condition of the electric wire by a sensing element based on the read identification number. The process of sensing the condition of the item is explained in detail in conjunction with FIG. 1 and FIG. 2 of the present invention.

The step 422 is then followed by a step 426 of generating a feedback data for the host controller based on the sensed condition of the electric wire. The feedback data contains the details of the data received on interaction with the items. In a preferred embodiment of the present invention, the data may relate to the identification number and sensed information about the item. The step 426 of generating the feedback data is explained in detail in conjunction with FIG. 1 of the present invention.

The step 426 is then followed by a step 428 of transmitting the feedback data received from the client controller to the computing device through the host controller. The step of transmitting data from the client controller to host controller and further from host controller is explained in detail in reference to FIG. 1, FIG. 2 and FIG. 3 of the present invention.

Figure 5:
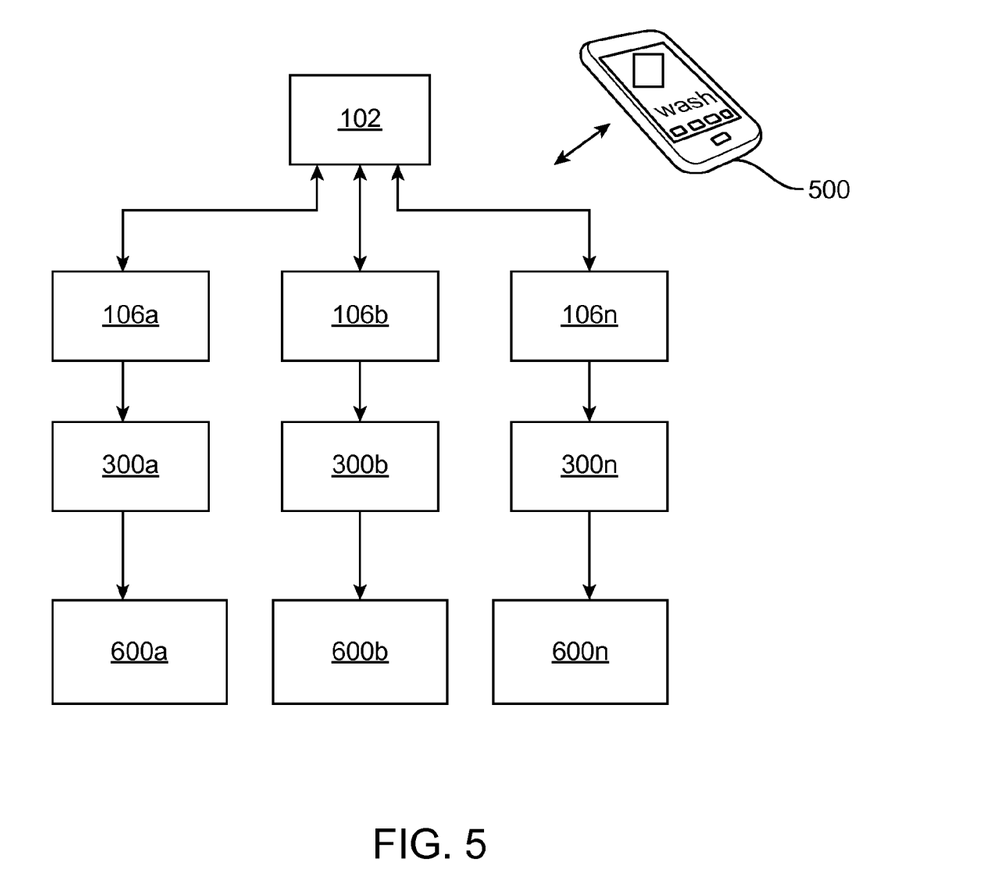
FIG. 5 illustrates a block diagram of a host interacting with multiple client units respectively wrapped around the items connected to the appliances.

FIG. 5 illustrates a block diagram of a host 102 interacting with multiple client units 106a,106b,106c respectively wrapped around the items 300a,300b,300n connected to the appliances 600a,600b,600n. Each client unit 106a,106b, 106n is allocated with a time slot to communicate with the host 102 via a wireless interface (shown and explained in FIG. 5). The time slot enables the host 102 to recognize and identify the client units 106a,106b,106n establishing communication via the wireless interface (shown and explained in FIG. 5). The time slot is programmed in the host controller corresponding to the client controller at the time when the client units 106a,106b,106n are wrapped around the items 300a,300b,300n.

The computing device 500 sends a command data associated with any one of the items 300a,300b,300n to the host 102. The host 102 processes the command data received from the computing device 500, and further generates an identification number for marking each item 300a,300b, 300n.

In an example, the computing device 500 sends a command data associated with two of the items 300a,300b to the host 102. The host 102 processes the command data received from the computing device 500, and further generates an identification numbers corresponding to the client units 106a, 106b attached to the items 300a,300b. The client units 106a,106b receive the identification numbers from the host 102 for marking the items 300a,300b for which the signal is send from the computing device 500. The client units 106a,106b monitor the condition of the items 300a,300b and further send the information about the conditions of the items 300a,300b to the host 102 using the allocated time slots.

In another preferred embodiment the computing device 500 sends the control data for controlling the condition of the items 300a,300b,300n connected to the appliances 600a, 600b,600n. The client units 106a,106b,106n control the condition of the items 300a,300b,300n based on the control data received from the computing device 500 through the host 102. The control data relates to the current control value of the items 300a,300b,300n such as electric wire.

There has thus been shown and described a method and a system for remotely interacting with item affected by electric field in the environment which fulfills all the items and advantages sought there for. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

Claims of the invention:

1. A system for remotely interacting with one or more items present in an environment for communicating with a computing device, said system comprising:
    a host connected to an alternating current source of the environment, comprising;
        a converter for generating DC power from the AC power received from the alternating current source;
        a generator for generating an electric field from contactlessly received DC power from the converter;
        a demodulator for receiving and transmitting data from the computing device;
        a host controller processes the data received from the demodulator, the host controller further generates a signal associated with an identification number on the basis of processed data for marking each item; and
        a wireless interface for sending the processed data received from the host controller to the computing device; and
    one or more client units for interacting with each item of the environment, the item conducts electrical current and creates magnetic field the one or more client units comprising:
        an electric field harvester for enhancing the electric field provided by the host, and the electric field harvester further stores DC power from the electric field;
        a client controller for processing the signal received via the modulated electric field from the host controller, and further the client controller reads the identification number for each item received from the host controller; and
        a sensing element for sensing a condition of the item based on the processed signal from the client controller, wherein the sensing element further comprising:
            a flexible conductive foil wrapped around the item for conducting the induced electric field;
            a ring electrode receives coupled power from the electric and magnetic field induced by the item and measures the induced magnetic field from the item; and
            a floating electrode for floating the electric field received from the ring electrode to the ground
        wherein the client controller generates a feedback data associated with the sensed condition of the item by determining change in the electric field and magnetic field around the sensing element, and the client controller sends the feedback data to the computing device via the host controller.

2. The system according to claim 1, further comprising a readable code unit placed on the sensing element for storing identification number of the item, wherein the communicating device reads the stored information inside the readable code unit for marking the item.

3. The system according to claim 1, wherein the electric field harvester comprising:
    a rectifier for generating a DC voltage corresponding to the electric field received from the surface of the sensing element; and
    a buffer for storing the DC voltage.

4. The system according to claim 1, wherein the client controller comprising an instrumentation amplifier for measuring a current value of the item; the instrumentation amplifier further configured to measure the condition of the item based on the measured current value of the item.

5. The system according to claim 1, wherein the client controller comprising an integrated analog digital modulating unit for modulating the alternating electric field with the identification number and the condition of the item.

6. The system according to claim 1, further comprising at least an acting element for notifying the condition of the item based on the processed signal from the client controller.

7. The system according to claim 6, wherein the client unit further comprising:
    a switch for switching operations of at least one of: the sensing element; acting element; and
    an interface for controlling the operations of the switch on receiving signal from the client controller.

8. The system according to claim 1, wherein the sensing element further senses the information related to at least one of the: proximity of a user; temperature; smoke; and light corresponding to the item.

9. A system for remotely interacting with one or more electric wires connected to an appliance for communicating with a computing device, said system comprising:
    a host connected to an alternating current source of the appliance, comprising;
        a converter for generating DC power from the received AC power from the alternating current source;
        a generator for generating an electric field from contactlessly received DC power from the converter;
        a demodulator for receiving and transmitting data from the computing device;
        a host controller processes the data received from the demodulator, the host controller further generates a signal associated with an identification number for marking each electric wire; and
        a wireless interface for sending the processed data received from the host controller to the computing device; and
    one or more client units for interacting with each electric wire of the appliance, the electric wires conducts electrical current and creates magnetic field the one or more client units comprising:

an electric field harvester for enhancing the electric field provided by the host, and the electric field harvester further stores DC power from the electric field;

a client controller for processing the signal received via the modulated electric field from the host controller, and further the client controller reads the identification number for each electric wire received from the host controller; and a sensing element for sensing a condition of the electric wire based on the processed signal from the client controller, wherein the sensing element comprising:

a flexible conductive foil wrapped around the electric wire for conducting the induced electric field;

a ring electrode receives coupled power from the electric and magnetic field induced by the electric wire and measures the induced magnetic field from the electric wire; and a floating electrode for floating the electric field received from the ring electrode to the ground wherein the client controller generates a feedback data associated with the sensed condition of the electric wire by determining change in the electric field and magnetic field around the sensing element, and the client controller sends the feedback data to the computing device via the host controller.

10. The system according to claim 9, wherein the electric field harvester comprising:

a rectifier for generating a DC voltage corresponding to the electric field received from the surface of the sensing element; and a buffer for storing the DC voltage.

11. The system according to claim 9, wherein the sensing element further senses the information related to at least one of the: proximity of a user; temperature; smoke; and light corresponding to the electric wire.

12. The system according to claim 9, further comprising at least an acting element for notifying the condition of the electric wire based on the processed signal from the client controller.

13. The system according to claim 12, wherein the client unit further comprising:

a switch for switching operations of at least one of: the sensing element; acting element; and an interface for controlling the operations of the switch on receiving signal from the client controller.

14. The system according to claim 9, wherein the client controller comprising an instrumentation amplifier for measuring a current value of the electric wire; the instrumentation amplifier further configured to measure the condition of the electric wire based on the current value of the electric wire.

15. The system according to claim 9, wherein the client controller comprising an integrated analog digital modulating unit for modulating the alternating electric field with the identification number and the measured condition of the electric wire.

* * * * *